United States Patent Office 3,498,883
Patented Mar. 3, 1970

3,498,883
PROCESS FOR THE PRODUCTION OF L-GLUTAMIC ACID
Takashi Iguchi, 528 Aza, Kamiyama, Kurume-machi, Kitatama-gun, Shiro Hayakawa and Isao Takeda, 27–63 Nakadai 3-chome, Itabashi-ku, and Saburo Senoh, 27–70 Nakadai 3-chome, Itabashi-ku, all of Tokyo, Japan
No Drawing. Continuation-in-part of application Ser. No. 474,967, July 26, 1965. This application Sept. 27, 1968, Ser. No. 763,353
Claims priority, application Japan, July 29, 1964, 39/42,632; Sept. 9, 1964, 39/51,844
Int. Cl. C12b 1/02; C12d 13/06
U.S. Cl. 195—28                                   8 Claims

ABSTRACT OF THE DISCLOSURE

A process for producing L-glutamic acid by inoculating hydrocarbon-utilizing microbes of the species *Corynebacterium petrophilum* into a medium comprising hydrocarbon as a resin source of raw material and a compound selected from the group consisting of antibiotics and surface active agents under aerobic conditions.

CROSS-REFERENCES TO RELATED APPLICATIONS

This application is entitled to the filing date of U.S. patent application, Ser. No. 474,967, filed July 26, 1965, now abandoned, for all subject matters common with it.

BACKGROUND OF THE INVENTION

The present invention relates to a process broadly defined under class definition of Class 195, Subclass 29, for producing L-glutamic acid by fermentation using microbes, and more particularly the invention concerns a process for producing L-glutamic acid which comprises inoculating the hydrocarbon-assimilating microbe belonging to the new species *Corynebacterium petrophilum*, ATCC 19080, into a fermentation medium containing hydrocarbon, nitrogen source, inorganic salts and organic nutrient source, fermenting said medium in the presence of compounds selected from the group consisting of antibiotics and surface active agents under aerobic conditions, and recovering the thus produced L-glutamic acid from the fermentation broth.

There was no agreement with the ATCC depository to limit the availability of the microorganisms at the time of filing the present application.

DESCRIPTION OF THE PRIOR ART

Certain microbes can produce as a fermentation product several amino acids, when cultivated in a medium containing hydrocarbon as a carbon source. However, the amount of each acid produced in such a medium is very low, and the accumulation of a considerable amount of a particular amino acid has never been observed. While emulsifiers and other surface active agents are required in a process disclosed in U.S. Patent 3,222,258, the amounts of L-glutamic acid produced thereby are negligible and the process is not economically feasible.

SUMMARY OF THE INVENTION

The primary object of the invention is to provide a practical, economical process for producing L-glutamic acid by using a cheap, easily available hydrocarbon as a main source of raw material.

In accordance with the invention, large quantities of L-glutamic acid were produced from liquid paraffins by hydrocarbon-utilizing microorganisms when penicillin was added to the growing culture. These microorganisms were distributed in wide range of gram-positive, -negative bacteria and in Nocardia. The gram-positive bacteria that accumulated a remarkable amount of L-glutamic acid was identified as the new species *Corynebacterium petrophilum* nov. sp.

On the production of L-glutamic acid, the effects on the additional concentration and phase of penicillin, on the organic nutrients such as corn steep liquor, and on the inorganic nitrogen sources were studies by *Cory. petrophilum* nov. sp. Various kinds of hydrocarbons were also tested. Synthetic penicillin, bacitracin, cycloserine, glycine and 5-bromo-uracil were effective for the accumulation of L-glutamic acid from liquid paraffin.

In accordance with the invention large amounts of amino acids, particularly L-glutamic acid, were produced in a medium containing an economical hydrocarbon as a main carbon source, and, by fermenting a medium containing microbes of the species *Corynebacterium petrophilum* ATCC 19080 which has the ability to assimilate hydrocarbon under specific conditions.

DESCRIPTION OF THE PREFERRED EMBODIMENTS

In the present invention fermentation is carried out in the presence of an appropriate amount of antibiotic or surface active agent as an additive. Thus, the present process is characterized by use of microbes of the species *Corynebacterium petrophilum* ATCC 19080 in a fermentation medium containing hydrocarbon as a carbon source, plus other components such as nitrogen and organic nutrient sources and inorganic salts, and an appropriate amount of antibiotic or surface active agents as an additive to aid in accumulating a large amount of L-glutamic acid in said medium.

The method of the present invention differs from any of the conventional methods for preparing L-glutamic acid by fermentation with respect to the carbohydrate and nitrogen sources used as medium components and in the microbe employed.

In accordance with the process of this invention, L-glutamic acid can be produced from hydrocarbon and a nitrogen source in the presence of an additive as set forth above, and the fact that this is possible is probably due to the characteristics of the new microbe of this invention, that is, in its metabolism of hydrocarbon, biosynthesis of amino acid, and in the permeability of the produced amino acid. This method for production of L-glutamic acid is unique and has never before been reported.

The most notable advantage of this method is that a cheap hydrocarbon having little or no fluctuation in its market cost is used as the main raw material.

The novel microbe employed is the most important factor in the constitution of this invention. The bacteriological properties of a typical microbe strain employed in the present fermentation process are described hereunder. The data were all obtained according to the experimental methods described in "Manual of Microbiological Methods" published by the Society of American Bacteriologist (1957).

(A) Microscopic view (sugar added meat extract agar; cultured at 37° C. for 48 hours)

(1) Appearance.—Observation by microscope showed all to be short rods having different sizes and round edges, and arranged in V-letter form, though some were in independent. Average size was around 0.4–0.6 x 0.7–0.9μ.

(2) Flagellum (dyed, electro-microscopic view)—not found.
(3) Motility (Claigy's method)—not found.
(4) Spore—not formed.
(5) Capsule—not found.
(6) Gram-staining—positive.
(7) Methachromatic granules—not observed.
(8) Acid fast-staining—negative.

(B) Colony view on agar plate (1) Appearance—round.
(2) Elevation—recessed.
(3) Surface—flat, smooth and wet.
(4) Edge—entire.
(5) Color—lemon.
(6) Lustre—dull.
(7) Transparency—opaque.

(C) Cultivation view (1) Agar slant—linear growth; not fair; no odor and no coloring of the culture medium.
(2) Agar stab—linear growth in the vicinity of the surface.
(3) Bouillon culture medium—poor growth; bacterial membrane always formed.
(4) Growth pH—about 5–10.
(5) Optimum growth temperature—about 30–37° C., no growth at 45° C.

(D) Physiological properties (1) Oxygen requirement—aerobic.
(2) Voges Proskauer's reaction—negative.
(3) Methyl red test—negative.
(4) Nitrate reduction—negative.
(5) Hydrogen sulfide production—negative (at Bacto-SIM Culture medium).
(6) Indol production—negative.
(7) Gelatin liquefaction—negative.
(8) Starch hydrolyzation—negative.
(9) Litmus milk culture—unchanged.
(10) Catalase—positive.
(11) Urease—positive.
(12) Carbohydrate utilization (tested for 48 hours). No acid and gas formation was observed from the following—arabinose, xylose, glucose, fructose, galactose, mannose, lactose, sucrose, maltose, trehalose, raffinose, dextrin, starch, mannitol, sorbitol, salicin, glycogen, and glycerol.

The above said bacteriological properties were analyzed in accordance with the classification standards described in "Bergey's Manual of Determinative Bacteriology," 7th edition. The present bacterium was roughly classified as either Corynebacteriaceae or Brevibacteriaceae in view of its positive gram staining, aerobic property, no spore formation, red appearance, negative motility and negative acid fast-staining properties. Judging from the fact that the microbes are of various sizes, the present bacterium should be classified in the family. Corynebacteriaceae which includes the following six generea described in a standard textbook:

Genus Corynebacterium
Genus Listeria
Genus Erysipelothrix
Genus Microbacterium
Genus Cellulomonas
Genus Arthrobacter In order to determine the particular genus further studies were conducted as described below. Since the microbe did not possess such characteristics as forming of filament arrangement, heat resistance, production of acid from lactose and the ability to decompose cellulose but did possess positive catalase activity, the present bacterium was first distinguished from genus Erysipelothrix, genus Microbacterium, genus Listeria, and genus Cellulomonas. Genus Arthrobactor was then ruled out because the bacterium did not possess "Gram variability," a specific characteristic of the microbes belonging to said genus. Therefore, the bacterium was finally classified as genus Corynebacterium. However, when the characteristics of the bacterium were compared with those of a known Corynebacterium as described in Bergey's Classification Manual, there seemed to be no identical genus. Furthermore, the bacterium was compared with strains newly discovered by Yamada et al. reported in "Agricultural and Biological Chemistry," 773–783, Vol. 27, No. 11, as a strain being capable of producing L-glutamic acid from hydrocarbon, but it was not identical to them in size, shape, ability to reduce nitrate, hydrogen sulfide production, starch hydrolyzation, and the like. Therefore, it was decided that said strain must be a new strain not listed in Bergey's Manual, and the inventors named this new bacterium "*Corynebacterium petrophilum.*" This strain has been deposited with the American Type Culture Collection where its deposit number is ATCC 19080.

The present invention is characterized by inoculating the new microbe, *Corynebacterium petrophilium*, ATCC 19080, into a common hydrocarbon fermentation medium containing hydrocarbon, inorganic salts, and nitrogen source together with an excess amount of organic nutrient required for the growth of said microbe, fermenting the medium in the presence of a member selected from the group consisting of antibiotics and surface active agents under aerobic conditions, and separating the thus produced L-glutamic acid from said medium. By this method a higher yield of L-glutamic acid can be obtained in less time.

The hydrocarbon source, that can be used in this invention includes crude oil, kerosene, heavy oil, gasoline, their fractionates, and their refined products. The organic nutrient source may be corn steep liquor, yeast extract, meat extract, peptone, various fermentation waste liquids and the like. The nitrogen source may be any of the various inorganic and organic compounds usually employed in fermentation of this kind, but the most practical materials are urea, ammonium salts and ammonia.

The fermentation of this invention must be carried out under aerobic conditions. Control of the pH of the fermentation medium is also a very important factor in this invention. Although, the present fermentation may be carried out by adjusting the pH of the initial medium to at least 6.0–8.5, in order to obtain a high yield of L-glutamic acid in the medium, it is advisable to keep the pH of the medium at 6.0–8.5 during fermentation by adding ammonia, ammonium salt, or other appropriate material. Any temperature suitable for growth of the microbes may be employed for the fermentation; a temperature between 28° and 33° C. has been found effective.

In practice, fermentation in accordance with this invention is carried out in the presence of compounds selected from an antibiotic such as penicillin (especially penicillin G and other synthetic penicillins), derivatives thereof, streptomycin, tetracycline, chloramphenicol, kanamycin, cycloserine, and peptide (for example, bacitracin), and surface active agents such as cetyl trimethyl ammonium bromide, Sofnon R2F–10 (trade name of Toho Chem. Co.: heterocyclic amine type), Lunox 25, Ovanol (trade name of Toho Chem. Co.), Emernon 3113 (trade name of Kao Sekken Co.: polyethyleneglycol monostearate), Tween–40 (trade name of Atlas Powder Co.), and other cationic, anionic and amphoteric surface active agents. One or more of these compounds may be added to the medium. The optimum time for addition of these compounds is between the early and middle stages of the fermentation; however, the surface active agents may be added at the early stage of the fermentation or prior to the inoculation of bacteria since such agents also help to disperse the hydrocarbon uniformly in the medium.

The effect of the above factors on the production of L-glutamic acid were studied by changing the amount of organic nitrogen source, the kind and amount of antibiotic or surface active agent, and the time for addition of agents. The procedures and the results of these tests are given below.

(1) Effect of variation in the amount of organic nitrogen source and antibiotic.—*Corynebacterium petrophilum* AS B–5400 strain, ATCC 19080, was inoculated into a medium containing 5% of n-hexadecane, 0.5% of urea, 0.2% of ammonium sulfate, 0.2% of $KH_2PO_4$, 0.2% of $Na_2HPO_4$, 0.05% of magnesium sulfate, 0.001% of manganese sulfate, 0.001% of zinc sulfate, and a defined amount of corn steep liquor as the organic nitrogen source, and having a pH of 7.0. Fermentation was carried out 2–3 days in the presence of potassium salt of penicillin G. The amount of L-glutamic acid accumulated in the medium was shown below.

| No. | Organic nutrient (percent) | Amount of penicillin GK added (unit/ml.) | Time of addition (hours) | Amount of L-glutamic acid accumulated (mg./dl.) |
|---|---|---|---|---|
| 1 | C.S.L., 0.01 | 0 | --- | 105 |
| 2 | C.S.L., 0.01 | 5 | 10 | 523 |
| 3 | C.S.L., 0.01 | 5 | 20 | 490 |
| 4 | C.S.L., 0.01 | 5 | 24 | 345 |
| 5 | C.S.L., 0.01 | 50 | 10 | 500 |
| 6 | C.S.L., 0.01 | 50 | 20 | 558 |
| 7 | C.S.L., 0.01 | 50 | 24 | 441 |
| 8 | C.S.L., 0.2; Y.E., 0.2 | 0 | --- | 72 |
| 9 | C.S.L., 0.2; Y.E., 0.2 | 5 | 10 | 1,008 |
| 10 | C.S.L., 0.2; Y.E., 0.2 | 5 | 20 | 962 |
| 11 | C.S.L., 0.2; Y.E., 0.2 | 5 | 24 | 884 |
| 12 | C.S.L., 0.2; Y.E., 0.2 | 50 | 10 | 1,216 |
| 13 | C.S.L., 0.2; Y.E., 0.2 | 50 | 20 | 1,137 |
| 14 | C.S.L., 0.2; Y.E., 0.2 | 50 | 24 | 1,099 |

C.S.L. = Corn steep liquor.
Y.E. = Yeast extract.

The results in the above table show clearly that the amount of L-glutamic acid accumulated in the medium increases in proportion to the increase in the amount of organic nutrient, and that excellent results are obtained when 50 units/ml. of antibiotic (penicillin) is added at the early stage of fermentation.

(2) Effect of various additives other than penicillin.— The same medium as shown in the preceding (1) was used in this test and 0.2% of corn steep liquor, and 0.2% of yeast extract were added thereto, and then *Corynebacterium petrophilum* AS B–5400 was inoculated therein. The fermentation was continued for 3 days.

| No. | Additive | Amount of additive (μg./ml.) | Time of addition (hours) | Amount of L-glutamic acid accumulated (mg./dl.) |
|---|---|---|---|---|
| 1 | None | --- | --- | 63 |
| 2 | Chloramphenicol | 10 | 10 | 100 |
| 3 | do | 10 | 20 | 110 |
| 4 | Tetracycline | 10 | 10 | 120 |
| 5 | do | 10 | 20 | 100 |
| 6 | Kanamycin | 10 | 10 | 100 |
| 7 | do | 10 | 20 | 90 |
| 8 | Cetyl trimethyl ammonium bromide | 100 | 10 | 140 |
| 9 | do | 100 | 20 | 120 |
| 10 | Sofnon $R_2T$-10 (Toho Chem. Co.) | 100 | 10 | 180 |
| 11 | do | 100 | 20 | 190 |
| 12 | Oyanol (Toho Chem. Co.) | 100 | 10 | 180 |
| 13 | do | 100 | 20 | 110 |
| 14 | Emernon 3113 (Kao Sekken Co.) | 100 | 10 | 200 |
| 15 | do | 100 | 20 | 190 |
| 16 | Tween 40 (Atlas Powder Co.) | 100 | 10 | 220 |
| 17 | do | 100 | 20 | 210 |
| 18 | Bacitracin (National Biochemicals Corp.) | 5 units | 15 | 502 |
| 19 | Cycloserine (Shionogi Pharm. Co.) | 50 units | 15 | 221 |

The same tests were repeated using synthetic penicillins.

| No. | Penicillin used | Amount added (μg./ml.) | Time of addition (hours) | Amount of L-glutamic acid accumulated (mg./dl.) |
|---|---|---|---|---|
| 1 | Phenoxyethyl penicillin K (Meiji Seika Co.) | 50 | 15 | 910 |
| 2 | Dibenzyl ethylenediamine dipenicillin G (Banyu Seiyaku Co.) | 50 | 15 | 670 |
| 3 | Penicillin V | 50 | 15 | 820 |

The additives used in the above tests are only specific examples and are not intended to limit the compounds which may be utilized in the present invention. Satisfactory results can also be obtained with various other compounds belonging to cationic, anionic, nonionic and atmospheric surface active agents, and antibiotics.

It is thought that such additives help to improve the permeability of the cell membrane to passage of the L-glutamic acid produced within bacterial cells to the outside thereof.

Any conventional method is satisfactory for recovery of the L-glutamic acid from the fermentation broth. For example, the following sequence of steps has proven satisfactory: filtering the bacterial cells; concentrating the filtrate; adjusting the pH of said concentrated filtrate to 3.2; and leaving it in a refrigerator to precipitate L-glutamic acid crystals.

The invention is illustrated by the following examples.

Example 1

A series of 500 ml. Sakaguchi flasks, each containing 100 ml. of fermentation medium comprising 0.2 g./dl. of yeast extract, 0.2 g./dl. of corn steep liquor, 0.5 g./dl. of urea, 0.2 g./dl. of $(NH_4)_2SO_4$, 0.2 g./dl. of $KH_2PO_4$, 0.2 g./dl. of $K_2HPO_4$, 50 mg./dl of magnesium sulfate, 1 mg./dl. of zinc sulfate and 5 g./dl. of hydrocarbons shown in the following table, the pH being adjusted to 7.0 with alkali and flasks being sterilized, was inoculated with *Corynebacterium petrophilum* AS B–5400, ATCC 19080, and fermented at 29° C. for 18 hours with shaking. Then, 50 units/ml. of penicillin G was added to each medium and the media were further fermented for 54 hours while maintaining the pH at 7.0–8.0. After 72 hours' fermentation, the amount of L-glutamic acid accumulated in each medium were examined. The results are shown below.

| Hydrocarbon | Number of carbon atoms | Amount of L-glutamic acid accumulated |
|---|---|---|
| Normal decane | $C_{10}$ | +++ |
| Normal undecane | $C_{11}$ | ++++ |
| Normal dodecane | $C_{12}$ | ++++ |
| Normal tridecane | $C_{13}$ | ++++ |
| Normal tetradecane | $C_{14}$ | ++++ |
| Normal pentadecane | $C_{15}$ | ++++ |
| Normal hexadecane | $C_{16}$ | ++++ |
| Light oil (B.P. 250–350° C.) | --- | +++ |

NOTE.—+++: 500~1,000 mg./dl.   ++++: 1,000 mg./dl. or more.

Example 2

*Corynebacterium petrophilum* AS B–5400, ATCC 19080, was cultured at 30° C. for 40 hours with shaking in a seed medium containing the following components:

| | |
|---|---|
| Mixed hydrocarbons (a mixture of nine n-paraffins of $C_{10}$–$C_{18}$) g | 50 |
| Urea g | 3 |
| $(NH_4)_2SO_4$ g | 2 |
| $KH_2PO_4$ g | 2 |
| $K_2HPO_4$ g | 2 |
| Magnesium sulfate g | 0.5 |
| Iron sulfate g | 0.001 |
| Zinc sulfate g | 0.005 |
| Manganese sulfate g | 0.005 |
| Corn steep liquor g | 3 |
| Yeast extract g | 3 |
| Water l | 1 | pH adjusted to 7.2.

50 ml. of the fermentation medium having the same composition as described above was poured into each of a series of 500 ml. flasks and these media were sterilized. 5 ml. of the above seed culture was then inoculated into these fermentation media and the fermentation was effected at 28°–33° C. for 15 hours under submerged aerobic conditions. At this point, 10 units/ml. of penicillin was added to each medium and the fermentation was further continued while maintaining the pH at 7.0–8.5 by adding urea. After a total of 4 days' fermentation, the average amount of L-glutamic acid accumulated in these media was 1.5 g./dl. The combined fermentation broth was filtered to remove bacterial cells, concentrated from 1 l. to about 250 ml., pH adjusted to 3.2 with hydrochloric acid, and allowed to stand in a refrigerator to give 11.2 g. of crude L-glutamic acid crystals.

Example 3

The same procedure as described in Example 1 was repeated using *Corynebacterium petrophilum* AS B–5400, ATCC 19080, but substituting a light oil fraction of Kaffge Oil (B.P. 230–359° C., specific gravity 0.83 (15/4° C.), 70% saturated hydrocarbon) for the hydrocarbons used therein. After 4 days' fermentation, the amount of L-glutamic acid accumulated in the medium reached 0.98 g./dl. By using the same procedure as described in Example 1, 5.7 g. of crude L-glutamic acid crystals was obtained from 1 l. of the fermentation broth.

Example 4

The same procedure as described in Example 2 was repeated by employing *Corynebacterium petrophilum* AS B–5400, ATCC 19080. In this particular example, 100 mg./dl. of Tween 40 (Atlas Powder Co.) was added to the medium in place of penicillin used in Example 1 after 16 hours from the initiating of the fermentation. The amount of L-glutamic acid accumulated in the medium after 4 days' total fermentation reached 1.0 g./dl.

A comparison of the L-glutamic acid yields obtained by employing the teachings of U.S. Patent 3,222,258 and those of the present invention are listed hereinafter:

In Example 1, the amount of L-glutamic acid produced by using *Corynebacterium petrophilum* AS B–5400 and penicillin is more than 10,000 mg./l. (1000 mg./dl.) or at least 5,000–10,000 mg./l. (500–1000 mg./dl.); in Example 2, it is 15,000 mg./l. (1.5 g./dl.); in Example 3, it is 9800 mg./l. (0.98 g./dl.); in Example 4, in which penicillin was replaced by Tween 40, it is 10,000 mg./l. (1.0 g./dl.).

U.S. PATENT 3,222,258

Ex. 1. *Corynebacterium oleophilus* Kp6-1414 _____ 85 mg./l.
Ex. 2. *Corynebacterium oleophilus* Kp6-1414 _____ 16 mg./l.
Ex. 3 (Table II):
   *Corynebacterium oleophilus* Kp10-1399 _____ 27 mg./l.
   *Corynebacterium oleophilus* K10-1452 _____ 10 mg./l.
   *Corynebacterium hydrocarboclastus* S-155 _____ 81 mg./l.
   *Corynebacterium hydrocarboclastus* S-179 _____ 69 mg./l.
   *Corynebacterium hydrocarboclastus* M-104 _____ 281 mg./l.
   *Corynebacterium hydrocarboclastus* M-134 _____ 67 mg./l.
   *Corynebacterium hydrocarboclastus* A-137 _____ 33 mg./l.
   *Brevibacterium acetylicum* M-101 _____ 6 mg./l.
   *Brevibacterium fulvum* A-34 _____ 12 mg./l.
   *Brevibacterium albus* S-270 _____ 16 mg./l.
   *Brevibacterium cerihus* K-129 _____ 6 mg./l.
Ex. 4. *Corynebacterium oleophilus* Kp6-1414 _____ 14 mg./l.
Ex. 5:
   *Corynebacterium oleophilus* Kp6-1414 _____ 36 mg./l.
   *Candida lipolytica* Y-8-4 _____ 11.3 mg./l.
   *Hansenula anomala* Y-32-5 _____ 9.0 mg./l.
   *Candida tropicalis* YO-129 _____ 22.5 mg./l.
Ex. 14. *Pseudomonas ovalis* 80-5 _____ L-valine.
Ex. 15. *Brevibacterium acetylicum* R-103 _____ L-threonine.
Ex. 16. *Corynebacterium hydrocarboclastus* M-104 _____ L-tryptophan.
Ex. 7 (Table VII):
   *Pseudomonas ovalis* 24-B _____ L-proline.
   *Candida tropicalis* YO-129 _____ Do.
Ex. 18. *Corynebacterium hydrocarboclastus* M-104 _____ Glycene, L-methionine, L-proline, L-serine.
Ex. 19:
   *Candida tropicalis* YO-129 _____ L-isoleucine, Glycine, L-methionine, L-serine.
   *Corynebacterium oleophils* Kp10-1399 _____ Isoleucine.
   *Corynebacterium oleophilus* Kp7-1428 _____ Glycine.

(Aminoacids other than L-glutamic acid were produced in Examples 7, 8, 9, 14, 15, 16, 17, 18 and 19 by employing similar species of microorganisms.)

It should be understood that the foregoing specification relates to only preferred embodiments of the invention and that it is intended to cover all changes, modifications and substitutions of materials in the examples of the invention chosen herein for the purposes of disclosure, which do not constitute a departure from the spirit and scope of the invention as claimed.

What is claimed is:

1. A process for producing L-glutamic acid which comprises inoculating hydrocarbon-utilizing microbes of the new species *Corynebacterium petrophilum*, ATCC 19080, into a medium containing hydrocarbon, nitrogen source, inorganic salts, and organic nutrient source, fermenting the medium in the presence of at least one compound selected from the group consisting of antibiotics and surface active agents under aerobic conditions, until a substantial amount of L-glutamic acid is produced in the medium and recovering the thus produced L-glutamic acid from said medium.

2. A process according to claim 1, wherein said fermentation is carried out at a pH of 6.0–8.5.

3. A process according to claim 1, wherein said fermentation is carried out at a temperature of between 28° and 33° C.

4. A process according to claim 1, wherein said organic nutrient source is at least one member selected from the group consisting of corn steep liquor, yeast extract, meat extract, and peptone.

5. A process according to claim 1, wherein said hydrocarbon is at least one member selected from the group consisting of crude oil, kerosene, heavy petroleum, light oil, and fractionates and refined products thereof.

6. A process according to claim 1, wherein said nitrogen source is at least one member selected from the group consisting of urea, ammonium salt and ammonia.

7. A process according to claim 1, wherein said inorganic salt is at least one member selected from the group consisting of phosphate, potassium salt, magnesium salt, iron salt, manganese salt, and zinc salt.

8. A process according to claim 1, wherein said antibiotic is a member selected from the group consisting of penicillin, streptomycin, tetracycline, chloramphenicol, kanamycin, cycloserine, and peptide, and said surface active agent is a member selected from the group consisting of cationic, anionic, amphoteric and nonionic surface active agents.

References Cited

UNITED STATES PATENTS 3,406,095  10/1968  Otsuka et al. _____ 195—28

LIONEL M. SHAPIRO, Primary Examiner

U.S. Cl. X.R.

195—114